Feb. 25, 1969  F. KATZMAN  3,429,088
MECHANICAL JOINT MEANS
Filed Aug. 2, 1966  Sheet 1 of 4
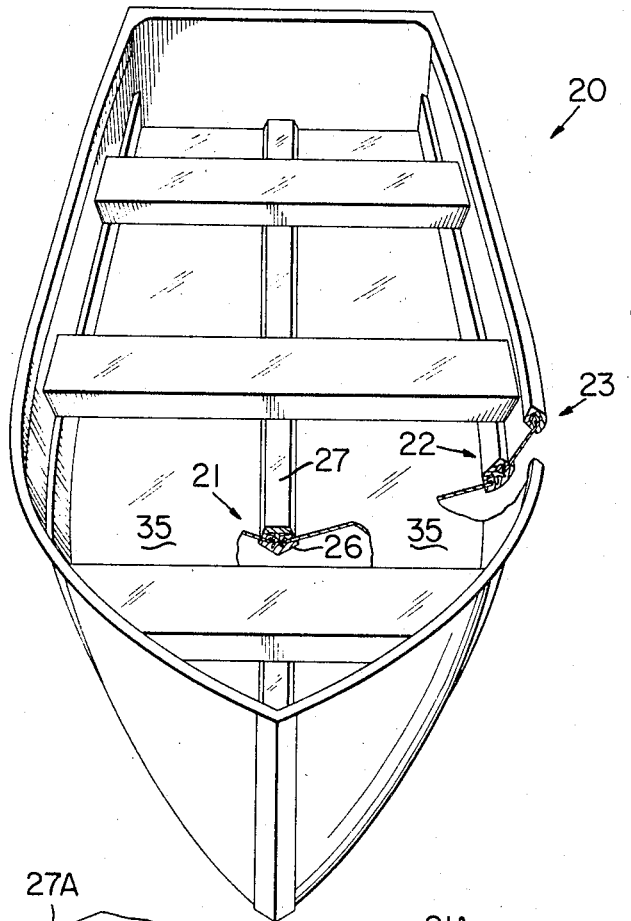
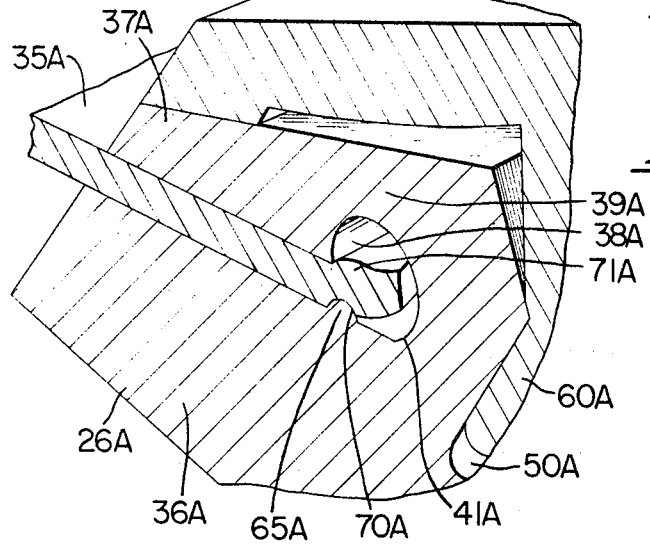
INVENTOR.
FREDERICK KATZMAN
BY
HIS ATTORNEYS

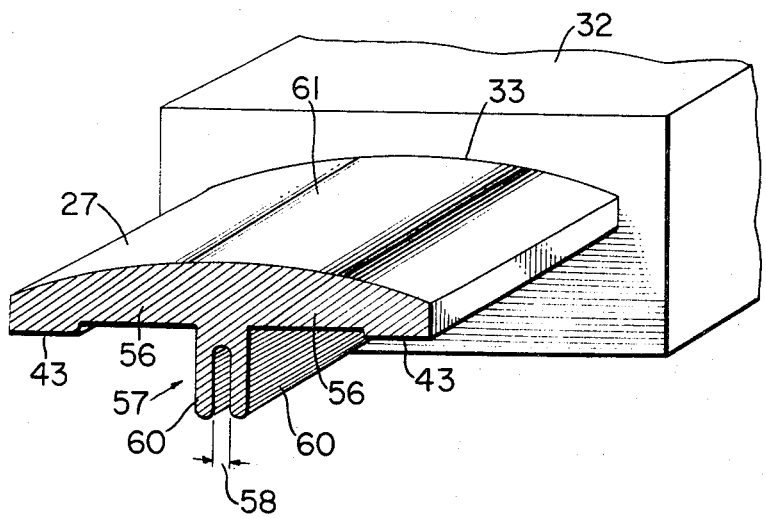
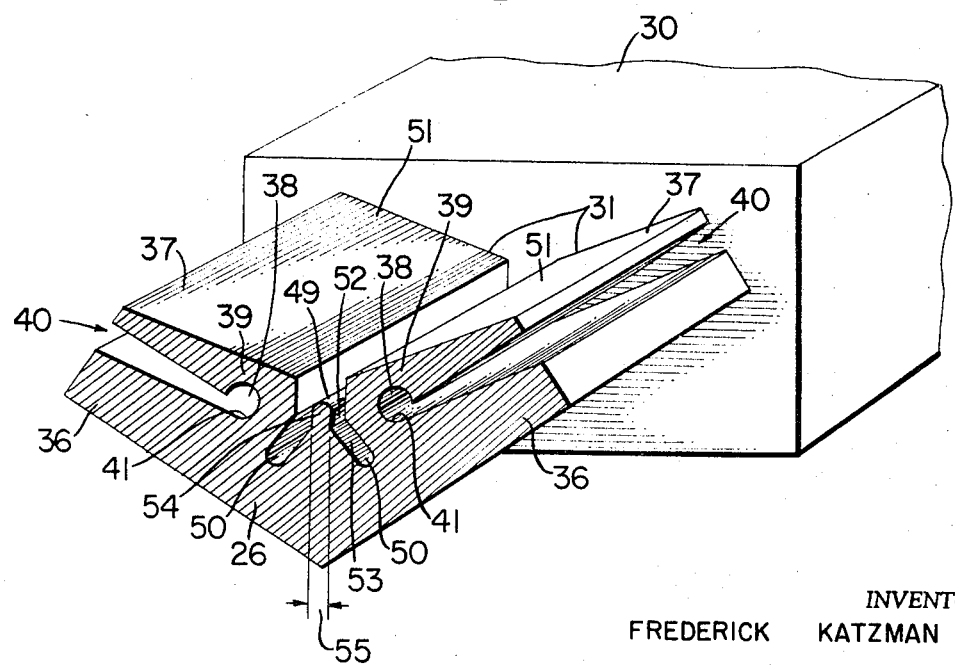

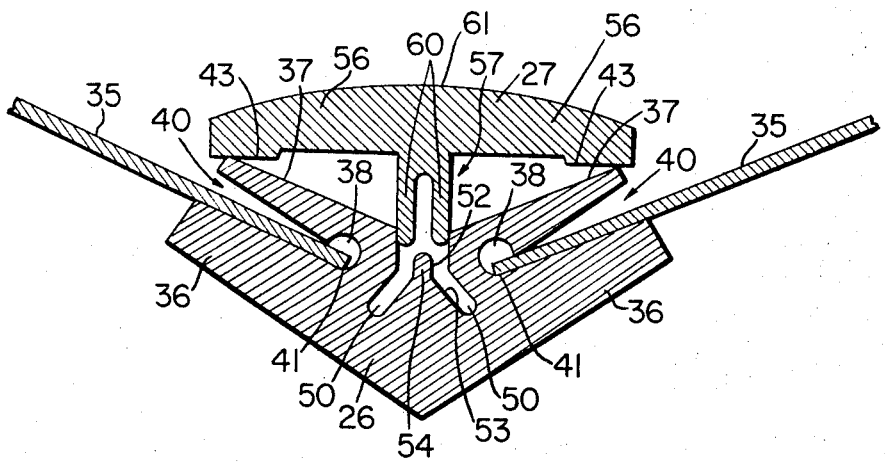
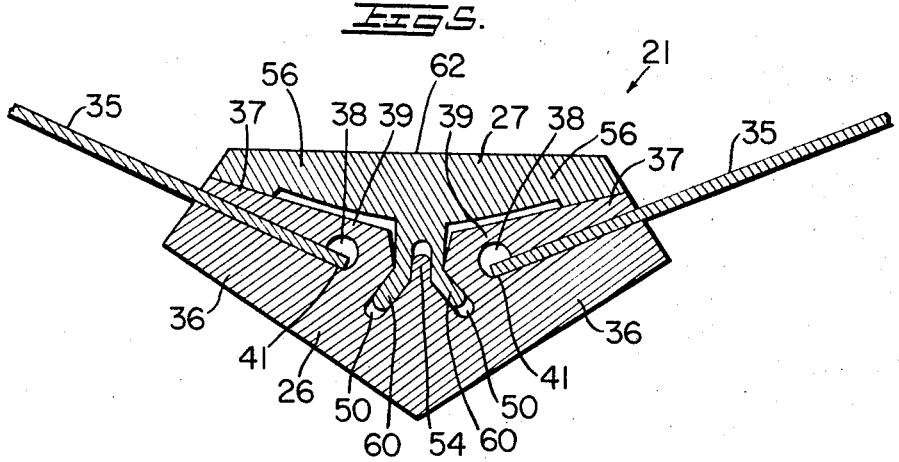

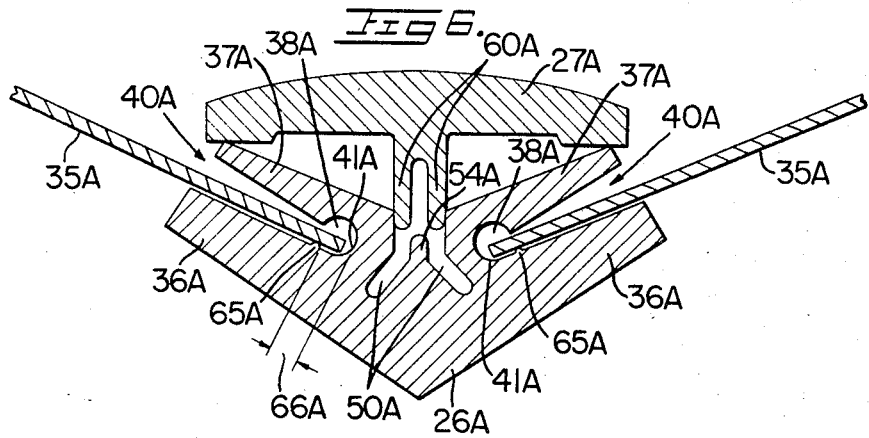
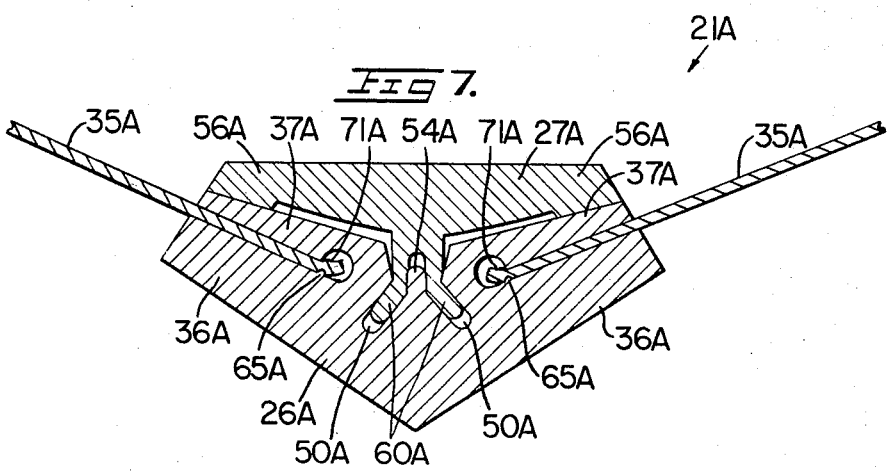
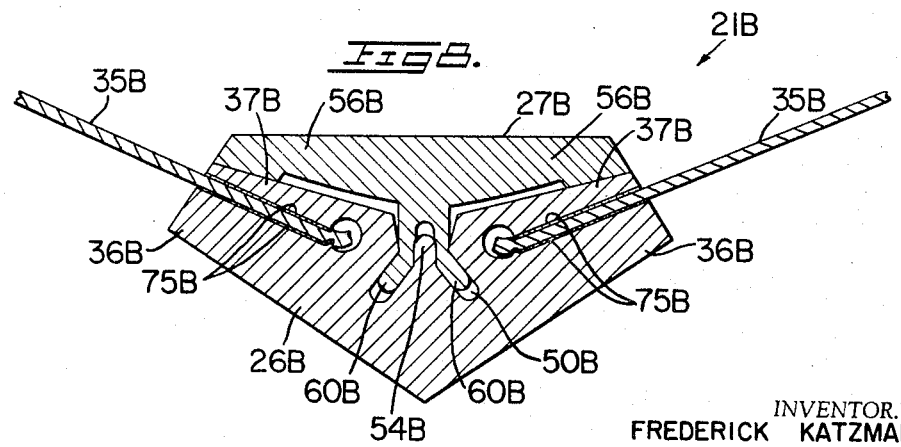

United States Patent Office 3,429,088
Patented Feb. 25, 1969

3,429,088
MECHANICAL JOINT MEANS
Frederick Katzman, Henrico County, Va., assignor to Reynolds Metals Company, Richmond, Va., a corporation of Delaware
Filed Aug. 2, 1966, Ser. No. 569,666
U.S. Cl. 52—463   8 Claims
Int. Cl. E04b 2/72; B63b 3/16; F16b 5/00

ABSTRACT OF THE DISCLOSURE

This disclosure relates to a mechanical joint which basically requires only two component parts and enables a pair of metal sheets, or the like, to be mechanically fastened together in a high-strength fluid-tight manner. The mechanical joint presented is particularly adapted for use in boat constructions and similar structures.

---

This invention pertains to mechanical joint means and more particularly to mechanical joint means for fastening sheet means in position.

Many currently used mechanical joint means used to fasten metal sheet means to an associated structural member are formed by welding such sheet means to such associated member. However, welded joints are generally expensive to produce and are thus not acceptable in those applications where cost is very important. Other currently used techniques for fastening metal sheets together or to an associated member utilize a plurality of rivets, bolts, or the like, or employ individual wedges which are wedged or inserted against such metal sheet means and such structural member. In those applications where it is important to provide a fluid-tight joint, such use of rivets, bolts, or separate wedges is not entirely satisfactory and introduces points through which the fluid can easily leak or seep. In addition, the use of a comparatively larger number of separate parts to form such a mechanical joint results in an expensive joint and a joint which is expensive to assemble.

Accordingly, it is a feature of this invention to provide improved mechanical joint means for fastening sheet means which is of simple and economical construction and utilizes a minimum number of component parts.

Another feature of this invention is to provide mechanical joint means particularly adapted for fastening together a plurality of metal sheet means and which provides a fluid-tight connection between such metal sheet means.

Another feature of this invention is to provide a simple fluid-tight mechanical joint means of the character mentioned for joining metal sheet means and comprising only two basic parts.

Another feature of this invention is to provide an improved mechanical joint means for sheet means utilizing the elastic deformation characteristics of metal members comprising such joint means to provide a nonfatiguing constant force clamping action.

Another feature of this invention is to provide improved mechanical joint means for joining metal sheet means comprised of two structural joining members and utilizing adhesive seal means therewith to provide a stronger junction while assuring an improved fluid-tight connection between such metal sheet means and such structural joining members.

Another feature of this invention is to provide mechanical joint means for holding together metal sheet means comprised essentially of two basic structural members in which one of such members has projection means therein for engaging and indenting such sheet means to provide improved holding thereof.

Another feature of this invention is to provide an improved economical method of making mechanical joint means for fastening metal sheet means.

Another feature of this invention is to provide an improved method of making high strength mechanical joint means joining metal sheet means to associated structural members made of metal utilizing the elastic characteristics of such structural members to provide a nonfatiguing constant force clamping of such metal sheet means to such members.

Another feature of this invention is to provide an improved method of making mechanical joint means for joining metal sheet means to associated structural members comprising such junction means utilizing seal means to provide an improved fluid-tight connection of high structural strength.

Another feature of this invention is to provide a pair of cooperating structural metal members comprising mechanical joint means for fastening metal sheet means thereto in which each of such metal members is formed inexpensively as an integral high strength unit.

Therefore, it is an object of this invention to provide an improved mechanical joint means and an improved method of making such mechanical joint means having one or more of the novel features of this invention as set forth above or hereinafter shown or described.

Other objects, uses, and advantages of this invention are apparent from a reading of this description which proceeds with reference to the accompanying drawings forming a part thereof and wherein:

FIGURE 1 is a perspective view of a boat with parts in section and parts broken away illustrating one exemplary application of the mechanical joint means of this invention.

FIGURE 2 is a perspective view with parts broken away illustrating urging member means comprising one of the basic units of the mechanical joint means of this invention and illustrating such urging member means being formed by extruding through suitable die means.

FIGURE 3 is a perspective view with parts broken away illustrating clamping member means adapted to cooperate with the urging member means illustrated in FIGURE 2 for clamping of a pair of sheet means on opposite sides thereof and particularly illustrating such clamping member means being formed by extruding through suitable die means.

FIGURE 4 is a sectional view illustrating sheet means inserted in clamping position in the clamping member means of FIGURE 3 and particularly illustrating the urging member means positioned above such clamping member means prior to fastening such clamping member means and urging member means together to clamp such sheet means in position.

FIGURE 5 is a sectional view illustrating the cooperating member means of FIGURE 4 after being fastened together in a fixed manner and showing the pair of metal sheets fastened in position in a fluid-tight manner.

FIGURE 6 is a sectional view similar to FIGURE 4 particularly illustrating projection means in the clamping member means used to aid in holding the metal sheet means firmly in position.

FIGURE 7 is a sectional view similar to FIGURE 5 illustrating the cooperating member means of FIGURE 6 fastened together and showing the action of the projection means in which an indentation is provided in such sheet means engaged by such projection means and a portion of such sheet means is also projected into opening means provided in such clamping member means generally opposite such projection means.

FIGURE 8 is a sectional view similar to FIGURE 7 particularly illustrating seal means inserted between the sheet means and clamping arms of the clamping member means to assure the provision of a fluid-tight mechanical joint and to aid in holding such sheet means firmly in position.

FIGURE 9 is an enlarged fragmentary perspective view particularly illustrating the action of the projection means of FIGURES 6 and 7 indenting the sheet means and pushing a portion of such sheet means into the cooperating associated opening means of such clamping member means and also showing wedging engagement and deformation of parallel leg means provided in such urging member means to enable fastening such urging member means and clamping member means together in a fixed manner.

While the various features of this invention are hereinafter illustrated and described as being particularly adaptable for providing improved mechanical joint means for use in a boat construction, or where fluid-tight mechanical joint means for sheet means is desired, and to an improved method of making such improved mechanical joint means, it is to be understood that the various features of this invention can be utilized singly or in any combination thereof to provide improved mechanical joint means for other uses, as desired, including applications where a fluid-tight joint is not required.

Therefore, this invention is not to be limited to only the embodiments illustrated in the drawings because the drawings are merely utilized to illustrate one of the wide variety of uses of this invention.

In the exemplary embodiment of this invention illustrated in FIGURE 1 of the drawings, a boat designated by the numeral 20 is illustrated and such boat has improved mechanical joint means of this invention provided at three exemplary locations in the construction thereof indicated generally by the numerals 21, 22, and 23. The detailed configurations of the structural members comprising the joint means at locations 21-23 will, of course, vary to suit the particular relative position of adjoining sheet means or adjoining mating components; however, the overall unique features of this invention are incorporated in each of the three exemplary constructions 21-23.

For ease of presentation and description only the mechanical joint means 21 comprising the keel of boat 20 will be explained in detail. It will be appreciated that the description for the joint means 22 and 23 would be quite similar.

The mechanical joint means or joint 21 is comprised basically of two component parts shown as a clamping member means or an approximately V-shaped clamping member 26 and urging member means shown as a T-shaped member 27, see FIGURES 2 and 3 of the drawings. V-shaped clamping member 26 and T-shaped member 27 of this example of the invention cooperate to define the keel of boat 20 and fasten together a pair of metal sheet means defining the lower hull of boat 20.

Members 26 and 27 are preferably made of metal for reasons which will be apparent from the description which follows and such metal preferably has a high modulus of elasticity. In the exemplary boat application of this invention, members 26 and 27 are preferably made of metal containing aluminum because of high strength and light weight characteristics of aluminum.

Clamping member 26 is formed as an integral unit of high structural strength preferably by extruding metal through suitable die means or die designated by the numeral 30 in FIGURE 3. Die 30 has opening means 31 therein corresponding to and defining the cross-sectional configuration of clamping member 26.

In a similar manner, urging member or T-shaped member 27 is also preferably formed as an integral high strength unit by extruding metal through suitable die means designated by the numeral 32 in FIGURE 2. Die 32 has suitable opening means 33 therein defining the cross-sectional configuration of T-shaped member 27.

As seen in FIGURES 1, 4, and 5 of the drawings, sheet means shown in this example as a pair of metal sheets, each designated by the numeral 35, are provided and such sheets are firmly fastened in position by members 26 and 27 in a fluid-tight manner to extend in opposite directions from clamping member 26 to define the sides or lower hull of boat 20, as previously mentioned. Each sheet 35 for this exemplary boat application is also preferably made of aluminum.

The clamping member or approximately V-shaped member 26 has clamping arm means shown as a pair of cooperating clamping arms extending from each side thereof. The corresponding lower arms of each pair have each been designated by the numeral 36 while the corresponding upper arms have been designated by the numeral 37.

Each pair of arms 36 and 37 extending outwardly from its associated side of clamping member 26 defines slot means shown as an outwardly flaring slot 40. As seen in FIGURES 4 and 5 of the drawings, the transverse dimension of slot 40, that is, the normal distance between associated arms 36 and 37 thereof, corresponds to the thickness of an associated metal sheet 35 so that a sheet 35 can be easily inserted within its slot 40 and bottomed against surface means shown at 41 defining bottom means or the bottom of slot 40.

The transverse dimension of each slot 40 and thickness of an associated sheet 35 are also suitably correlated to assure firm clamping of each sheet 35 once arms 36 and 37 defining such slot are firmly relatively compressed toward each other. Slot 40 has a comparatively large opening means or an elongated roughly semicylindrical cutout portion or opening indicated at 38 and defining the base or bottom portion of each slot 40. Cutout 38 with its arcuate configuration provides a stress relieving means assuring that arm 37 can be compressed toward arm 36 without damage. In addition cutout 38 slightly reduces the effective thickness of arm 37 at its base as shown at 39 to further enable easy flexing of such arm.

The compressing of each arm 37 is provided, upon suitably fastening members 26 and 27 together, by bearing surface means shown as a pair of bearing surfaces each designated by the numeral 43 and provided at spaced apart locations on member 27. Each surface 43 engages an associated clamping arm 37 to compress such arm toward its opposite arm 36 and thereby firmly clamp each metal sheet 35 between its associated pair of clamping arms 36 and 37. Thus, as seen in FIGURES 4 and 5, sheets 35 are inserted within their associated outwardly flaring slots 40 and T-shaped urging member 27 is firmly fastened in position against V-shaped clamping member 26 to thereby compress arm 37 of each pair toward its associated arm 36 and thereby firmly clamp the metal sheets 35 in position.

V-shaped clamping member 26 has fastening means therein cooperating with fastening means provided in T-shaped member 27 for fastening members 26 and 27 together in a fixed manner. The fastening means in member 26 comprises groove means shown as a pair of grooves each designated by the numeral 50 and extending inwardly into clamping member 26 in a nonrectilinear path.

Each groove 50 extends inwardly from outside surface means shown as a pair of outside surfaces each designated by the numeral 51 and arranged in a V-shaped manner. Each groove 50 is of generally uniform configuration throughout its length and extends in a nonrectilinear path by first extending in one direction to define a straight section 52 and then turning sharply outwardly at an angle with respect to section 52 and extending in another direction to define a second straight section designated by the numeral 53.

The groove section 53 of each groove 50 comprises the major portion of its length and when viewing the overall arrangement of grooves 50 in member 26 it will be apparent that they are arranged in a roughly inverted V-shaped arrangement. Grooves 50 are also arranged in member 26 so as to be bounded by slots 40.

The straight portions 52 of grooves 50 are arranged in spaced apart parallel relation in this example of the invention defining integral guide member means or a guide member 54 having a width as indicated at 55 and a semicylindrical outer end 49. Member 54 guides cooperating members, which will be described later, of T-shaped member 27 into grooves 50 to provide a firm fastening action.

The urging member means or T-shaped member 27 has a pair of integral compressing member means each cooperating with a different pair of the two pairs of arms comprising clamping member 26. The compressing member means of member 27 comprises a pair of transverse bar means shown as a pair of transverse bars each designated by the numeral 56 and extending from opposite sides of central vertical member 57 of T-shaped member 27.

Each transverse bar 56 has the bearing surface means or bearing surface 43 previously mentioned defining the lower terminal end portion of such bar. Upon fastening members 26 and 27 together each bearing surface 43 engages an associated arm 37 and compresses such arm against sheet 35 to provide a firm clamping action.

T-shaped member 27 has integral fastening means for cooperation with groove means 50 and comprising a pair of rectilinear leg means shown as a pair of legs each designated by the numeral 60 and arranged in parallel spaced apart relation to define lower end means of its central vertical member 57. Parallel spaced apart legs 60 are spaced apart by a distance as shown at 58 corresponding to while being slightly smaller than the width 55 of guide member 54. Also the thickness of each leg 60 corresponds to and is slightly larger than the width of each groove 50.

Having described the fastening means in member 26 comprised of grooves 50 and the cooperating fastening means or legs 60 in member 27, the manner of fastening members 26 and 27 together with sheets 35 in position is apparent. As indicated above, sheets 35 are first inserted in associated slots 40 and T-shaped member 27 is then positioned above V-shaped member 26 as shown in FIGURE 4. Members 26 and 27 are forced together by any suitable means such as a press or the like to thereby force each leg 60 within an associated groove 50. The forcing action is such that it wedges each leg 60 firmly in its associated groove 50 while simultaneously bending such leg so that it follows the contour of such groove. This wedging-deforming action firmly fastens T-shaped member 27 and V-shaped member 26 together in a fixed manner.

As T-shaped member 27 is urged from its unfastened position illustrated in FIGURE 4 of the drawings to its fastened position shown in FIGURE 5, it will be seen that each compressing arm 56 of such T-shaped member engages and urges an associated clamping arm 37 toward its cooperating arm 36. This compressing action closes the outwardly flaring groove 40 so that an associated sheet 35 is firmly fastened between arms 36 and 37.

Prior to fastening members 26 and 27 together, it will be noted that member 27 has an outwardly convex top transverse surface as shown at 61 in FIGURE 4. However, upon fixing member 27 into position in V-shaped member 26, arms 37 are compressed against their associated sheets 35 and outwardly convex surface 61 is bowed, slightly elastically deformed, toward V-shaped member 26 to the essentially horizontal position shown at 62 in the example presented in FIGURE 5.

The coperating arrangement of members 26 and 27 is such that the deforming-fastening action of legs 60 wedged in associated grooves 50 is sufficient to firmly hold T-shaped member 27 fastened in the fixed position of FIGURE 5 with its projecting bars 56 each being elastically deformed against an associated clamping arm 37.

As indicated above, the deformation of each integral bar 56 occurs within the elastic limit of the particular metal used to make member 27. Thus, with T-shaped member 27 fixed in position in V-shaped member 26, a constant nonfatiguing force is applied to relatively urge cooperating arms 36 and 37 together and to hold the sheets 35 firmly clamped in position in a fixed manner.

It will be appreciated, therefore, that the improved mechanical joint of this invention utilizes the elastic characteristics of a metal, such as aluminum in this example, to provide a constant clamping force and thereby assure that a fluid-tight joint is provided between each sheet 35 and joining members 26 and 27.

Except for several additional features, the mechanical joint means illustrated in FIGURES 6 and 7 of the drawings is practically identical to the mechanical joint 21 previously described and presented in FIGURES 4 and 5. Therefore, the joint of FIGURES 6 and 7 will be designated by the same numeral 21 followed by the letter designation A and component parts of joint 21A corresponding to practically identical parts of joint 21 will be designated by the same numeral as previously also followed by the letter A and not described again. Only those members or features which are different from those provided in the previous embodiment will be designated by a new reference numeral, also followed by the letter designation A, and described in detail.

Each clamping arm 36A has projection means therein shown preferably as an integral projection 65A, see FIGURE 9. Projection 65A extends generally transverse to the axis of its associated slot 40A and is spaced apart from bottom 41A of such slot 40A by a distance indicated at 66A. Each projection 65A is positioned along associated slot 40A so that it is generally opposite opening means 38A defining the lower end portion of slot 40A.

As T-shaped member 27A is fastened in position in a fixed manner against cooperating member 26A to clamp sheets 35A in position, each clamping arm 37A is urged toward an associated arm 36A. This action forces projection 65A in each arm 36A against its associated metal sheet 35A thereby providing an indentation therein as illustrated at 70A. Indentation 70A helps hold sheet 35A firmly in position and prevents it from being withdrawn from mechanical joint 21A while helping to provide an improved fluid-tight junction.

Each projection 65A also causes a side portion of associated sheet 35A to be forced or projected into opening means 38A in the form of a projection indicated at 71A. Projection 71A cooperates with projection 65A and the clamping action provided by arms 36A and 37A to assure that an associated sheet 35A cannot be withdrawn.

In this embodiment of the invention as in the previous embodiment each leg 60A of T-shaped member 27A is wedged and deformed in position in an associated nonrectilinear groove 50A to assure that members 26A and 27A are firmly fastened together.

To further assure that a fluid-tight connection of high strength is provided in those applications where such added assurance is desired, improved seal means is also utilized in associated with the improved mechanical joint means of this invention. Such seal means is illustrated in the embodiment of this invention illustrated in FIGURE 8 of the drawings.

The joint means shown in the embodiment of FIGURE 8 utilizes components identical to those components illustrated in FIGURES 6 and 7 of the drawings and therefore such joint means and identical components will be designated by the same numerals as before followed by the letter designation B and not described again. Joint 21B, however, also utilizes seal means shown as a plurality of seals each designated by the numeral 75B and provided between each metal sheet 35B and an associated adjoining arm.

Each seal 75B is preferably a pressure sensitive adhesive seal. However, such seal might be in the form of a rubber or plastic member or a suitable sealing cement, or the like.

Seal 75B in this exemplary embodiment of the invention is shown adjoining both opposite surfaces of sheet 35B; it will be appreciated that seal means 75B be sandwiched between only one surface of sheet 35B and an adjoining clamping arm means.

Adhesive seal means 75B utilized in mechanical joint 21B helps provide further assurance that such joint is fluid-tight. In addition, when using a seal having adhesive qualities the strength of the joint provided is also further increased.

It will be appreciated, however, that the mechanical joint provided by joints 21, 21A, and 21B all provide an improved economically produced fluid-tight joint means assuring that in using any of such joint means in a boat construction leakage does not occur.

As previously mentioned, the V-shaped member and cooperating T-shaped member provided in each exemplary embodiment of this invention are preferably made of aluminum and by extruding through suitable die means as previously explained. Such members have been previously successfully made for a boat application using 6061–T6 aluminum. Such aluminum has the desired strength and modulus of elasticity while being of exceptionally light weight. In the above mentioned boat application sheet means or panels .050 inch thick and made of 5005–H32 aluminum were used successfully.

The mechanical joint illustrated and described in detail in this example of the invention has been the joint used to define the keel of boat 20, however, it will be appreciated that the mechanical joint provided may be of a different detailed configuration and utilized to fasten either one sheet means or a plurality of sheet means in position.

While the various component members comprising the joint means of each illustrated embodiment of this invention were described as being made of metal containing aluminum, it will be appreciated that other materials may be utilized, including metals such as steel, or the like, as well as plastic materials, for example.

Terms such as "upper," "lower," "side," "downwardly," and the like, have been used throughout this disclosure merely for ease of description and to explain the arrangement and operation of the various components as shown in the drawings, and such terms should not be considered as limiting the scope of this invention in any way.

Thus, it is seen that an improved unique mechanical joint means has been provided for fastening metal sheet means to associated structural members to provide an economical high strength connection.

Further, this invention provides an improved method of making such improved mechanical joint means in a simple and efficient manner.

While the form of the invention now preferred has been disclosed as required by statute, other forms may be used, all coming within the scope of the claimed subject matter which follows.

What is claimed is:

1. A mechanical joint comprising, a clamping member, said clamping member having an approximately V-shaped cross-sectional configuration and a pair of cooperating integral clamping arms extending from each side of said clamping member, each cooperating pair of arms defining an outwardly flaring slot therebetween which is adapted to receive an associated one of a pair of sheets therewithin, with the slots provided in said clamping member having their bottoms arranged in spaced apart relation adjacent the central portion of said clamping member and having their axes arranged in a substantially V-shaped configuration, and an urging member fastened against said clamping member and having portions engaging an associated arm of each cooperating pair of arms to clamp an associated sheet between each cooperating pair of arms upon forming said joint using said members, said clamping member having a pair of grooves provided therein each extending inwardly from outside surface means of said clamping member with said pair of grooves being arranged between the spaced apart bottoms of said pair of slots, said urging member having a pair of fastening legs which are wedged within said slots so that surface portions of said clamping member defining the sides of each of said grooves engage and firmly hold an associated fastening leg of said urging member in position, said urging member having a pair of transverse bars, and with said urging member held firmly in position by its fastening legs each transverse bar is urged firmly against an associated arm of each cooperating pair of arms of said clamping member to clamp an associated sheet between each cooperating pair of arms.

2. A joint as set forth in claim 1 in which one arm of each cooperating pair of arms of said clamping member has an integral projection which extends within and generally transverse to its associated slot and in spaced apart relation from the bottom of said associated slot, with each projection indenting and holding its associated sheet upon forming said mechanical joint.

3. A joint as set forth in claim 2 in which said clamping member has a comparatively large opening means defining the lower end portion of each slot with each projection being positioned generally opposite an associated opening means so that upon forming said mechanical joint each projection also causes a side portion of its associated sheet to be projected within the oppositely arranged opening means to form another projection which cooperates with the first named projection to further assure the associated sheet is held in position.

4. A joint as set forth in claim 1 in which each of said grooves in said clamping member extends in a nonrectilinear path.

5. A joint as set forth in claim 4 in which said urging member comprises a generally T-shaped member having said pair of fastening legs defining the lower end portion of the central member of said T-shaped member and said pair of transverse bars each extends from a side of said central member, each transverse bar having a bearing surface adjoining its terminal end which is urged firmly against an associated arm.

6. A clamping member having an approximately V-shaped cross-sectional configuration and being adapted to cooperate with an associated urging member to form a mechanical joint for fastening an associated pair of sheets against said clamping member, said clamping member comprising, a pair of cooperating integral clamping arms extending from each side of said clamping member, each cooperating pair of arms defining an outwardly flaring slot therebetween which is adapted to receive an associated one of said pair of sheets therewithin, with the slots provided in said clamping member having their bottoms arranged in spaced apart relation adjacent the central portion of said clamping member and having their axes arranged in a substantially V-shaped configuration, and a pair of grooves in said clamping member each extending inwardly from outside surface means of said clamping member, said pair of grooves being arranged between the spaced apart bottoms of said pair of slots and the surface portions of said clamping member defining the sides of each of said grooves being adapted to engage and hold an associated fastening leg of said urging member enabling portions of said urging member to be urged firmly against an associated arm of each cooperating pair of arms to clamp an associated sheet between each cooperating pair of arms upon forming said joint using said clamping member.

7. A clamping member as set forth in claim 6 in which one arm of each cooperating pair of arms has an integral projection which extends within and generally transverse to its associated slot and in spaced apart relation from bottom of said associated slot, with each projection being adapted to indent and help hold its associated sheet upon forming said mechanical joint.

8. A clamping member as set forth in claim 7 having a comparatively large opening means defining the lower end portion of each slot with each projection being positioned generally opposite an associated opening means so that upon forming said mechanical joint each projection also causes a side portion of its associated sheet to be projected within the oppositely arranged opening means to form another projection which cooperates with the first named projection to further assure the associated sheet is held in position.

References Cited

UNITED STATES PATENTS

| 2,763,346 | 9/1956 | Clingman | 52—495 X |
| 3,066,773 | 12/1962 | Raidel | 287—189.36 |
| 3,168,425 | 2/1965 | Wiplinger | 287—189.36 X |
| 3,190,409 | 6/1965 | Petterson | 287—189.36 X |

FOREIGN PATENTS 118,902   9/1930   Austria.

HENRY C. SUTHERLAND, *Primary Examiner.*

P. C. FAW, JR., *Assistant Examiner.*

U.S. Cl. X.R.

9—6; 52—282, 495, 732; 287—189.36